United States Patent [19]
Sacripante et al.

[11] Patent Number: 5,817,169
[45] Date of Patent: *Oct. 6, 1998

[54] OXAZOLINE HOT MELT INK COMPOSITIONS

[75] Inventors: Guerino G. Sacripante, Oakville; Stephan V. Drappel, Toronto; Daniele C. Boils-Boissier; Fatima M. Pontes, both of Mississauga, all of Canada

[73] Assignee: Xerox Corporation, Stamford, Conn.

[ * ] Notice: The term of this patent shall not extend beyond the expiration date of Pat. No. 5,698,017.

[21] Appl. No.: 962,020

[22] Filed: Oct. 31, 1997

Related U.S. Application Data

[63] Continuation of Ser. No. 719,532, Sep. 27, 1996, Pat. No. 5,698,017.

[51] Int. Cl.$^6$ .................................................. C09D 11/02
[52] U.S. Cl. ................................... 106/31.43; 106/31.29; 106/31.35; 106/31.49; 106/31.61; 106/31.67; 106/31.75; 106/31.78
[58] Field of Search ........................ 106/31.29, 31.35, 106/31.49, 31.61, 31.67, 31.78, 31.43, 31.75

[56] References Cited

U.S. PATENT DOCUMENTS

| | | | |
|---|---|---|---|
| 2,372,410 | 3/1945 | Tryon | 260/307 |
| 3,336,145 | 8/1967 | Purcell | 106/176 |
| 3,708,334 | 1/1973 | Firth et al. | 106/31.46 |
| 4,205,176 | 5/1980 | Zestermann et al. | 548/239 |
| 4,288,361 | 9/1981 | Zestermann et al. | 106/270 |
| 4,490,731 | 12/1984 | Vaught | 106/31.29 |
| 5,006,170 | 4/1991 | Schwarz et al. | 106/31.3 |
| 5,041,161 | 8/1991 | Cooke et al. | 106/31.29 |
| 5,221,335 | 6/1993 | Williams et al. | 106/23 A |
| 5,593,486 | 1/1997 | Oliver et al. | 106/31.3 |
| 5,599,859 | 2/1997 | Tonogaki et al. | 106/31.78 |
| 5,667,568 | 9/1997 | Sacripante et al. | 106/31.29 |
| 5,688,312 | 11/1997 | Sacripante et al. | 106/31.29 |
| 5,698,017 | 12/1997 | Sacripante et al. | 106/31.49 |
| 5,700,316 | 12/1997 | Pontes et al. | 106/31.29 |

FOREIGN PATENT DOCUMENTS

WO 96 10051  4/1996  WIPO.

*Primary Examiner*—Helene Klemanski
*Attorney, Agent, or Firm*—E. O. Palazzo

[57] ABSTRACT

An ink composition comprised of a colorant and a vehicle component, and which vehicle component is comprised of the condensation product of an organic acid and an amino alcohol.

21 Claims, No Drawings

OXAZOLINE HOT MELT INK COMPOSITIONS

This application is a continuation of application Ser. No. 08/719,532, filed Sep. 27, 1996 now U.S. Pat. No. 5,698,017.

PENDING APPLICATIONS AND PATENTS

Hot melt inks for acoustic jet printing are illustrated in patents and copending applications U.S. Pat. No. 5,688,312; U.S. Pat. No. 5,747,554 and U.S. Ser. No. 641,866, the disclosures of each application being totally incorporated herein by reference.

BACKGROUND OF THE INVENTION

The present invention is directed to ink compositions and, more specifically, the present invention relates to hot melt inks especially useful for acoustic ink printing, processes and apparatuses, reference, for example, U.S. Pat. No. 5,121,141, U.S. Pat. No. 5,111,220, U.S. Pat. No. 5,128,726, U.S. Pat. No. 5,371,531, and U.S. Ser. No. 176,381 now abandoned, the disclosures of which are totally incorporated herein by reference, including especially acoustic ink processes as illustrated in some of the aforementioned copending applications and patents, such as an acoustic ink printer for printing images on a record medium.

More specifically, the present invention is directed to hot melt acoustic ink compositions wherein there can be generated with such inks excellent developed images with acceptable image permanence, excellent projection efficiency on transparencies without a post fusing step, and excellent crease resistance, pen-offset resistance, nonsmearing, high projection efficiency, and wherein the inks possess acceptable, and in embodiments superior lightfastness and superior waterfastness. Moreover, in embodiments of the present invention there is enabled the elimination, or minimization of undesirable paper curl since water is not present, or very small amounts thereof are selected, in the invention inks, and it is preferred that there be an absence of water, and since water is not present in the inks a dryer can be avoided thereby minimizing the cost and the complexity of the acoustic ink jet apparatus and process. The inks of the present invention in embodiments thereof are comprised of a colorant and a vehicle derived from the condensation product of an organic acid and an amino alcohol with the optional presence of a polycondensation catalyst, and which condensation reaction is accomplished at elevated temperature such as from about 150° to about 180° C. The invention ink vehicle possesses, for example, desirable viscosities, for example 1 to about 25, and about 5 centipoise at suitable temperatures, for example from about 120° to about 150° C., acceptable acoustic loss, and improved hardness or penetration. The aforementioned vehicle is comprised in embodiments of the reaction product of an organic acid and amino alcohol, such as an oxazoline, amide and/or amino ester as illustrated herein, reference for example Formula 1, and wherein $R_1$ is an aliphatic, for example alkyl of 1 to about 55 carbon atoms such as ethyl, propyl, butyl hexyl, stearyl and the like, $R_2$, $R_3$, $R_4$ and $R_5$ are an aliphatic group, for example alkyl of 1 to 55, such as ethyl, propyl, butyl, hexyl, stearyl, or alkylene-ester, such as ethylene acetate or methylene stearate, or an alcohol from about 2 to about 6 carbon atoms, such as methanol, ethanol, propanol and the like. It is believed that the major product from the aforementioned condensation is an oxazoline or benzoxazoline illustrated, for example, by Formulas or structures I and Ia, respectively, and present in the ink in an effective amount of from about 65 to about 100 percent by weight of the condensation product, and preferably from about 85 to about 100 percent of the condensation product. The minor constituents of the condensation product are an amide, as illustrated by structure II or IIa, or amino ester as illustrated by structure III, or mixtures thereof present in the product in amount of from about 0 to about 35 percent by weight, and preferably from about 0 to about 15 percent by weight of the condensation product. With mixtures from about 1 to about 99 weight percent or parts of the amide, and from about 99 to about 1 weight percent or parts of the amino ester are present in embodiments.

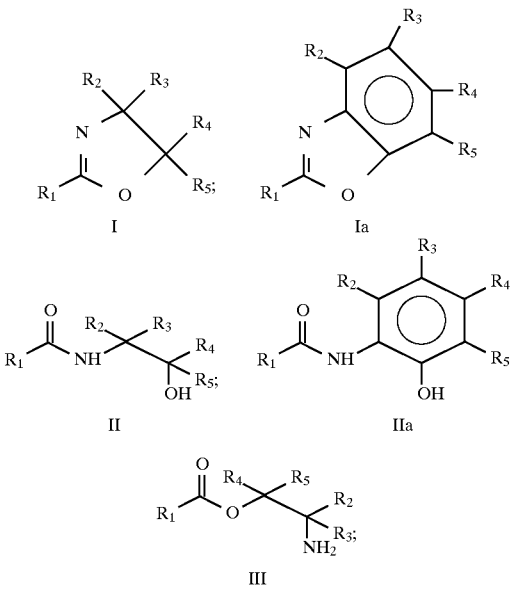

In acoustic ink printing, the printhead produces approximately 2.2 picoliter droplets by an acoustic energy process. The ink under these conditions should preferably display a melt viscosity of about 5 to about 25 centipoise or less at the jetting temperature. Furthermore, once the ink is jetted onto the paper, the ink image should possess excellent crease properties, and excellent pen non-offset properties, and should be nonsmearing waterfast, of excellent transparency, and excellent fix qualities. In selecting an ink for such applications, it is desirable that the vehicle display a low melt viscosity, such as from about 1 centipoise to about 20 centipoise in the acoustic head, while also displaying solid-like properties after being jetted onto paper. Since the acoustic head can effectively tolerate a temperature up to about 180° C., and preferably up to a temperature of from about 142° C. to about 160° C., the vehicle for the ink should preferably display liquid-like properties, such as a viscosity of 1 to about 10 centipoise at a temperature of from about 110° C. to about 165° C., and solidify or harden after jetting onto paper, such that the ink displays a hardness value of from about 0.1 to about 0.5 millimeter utilizing a penetrometer according to the ASTM penetration method D1321.

Ink jet printing processes that employ inks that are solid at room temperature and liquid at elevated temperatures are known. For example, U.S. Pat. No. 4,490,731, the disclosure of which is totally incorporated herein by reference, discloses an apparatus for dispensing certain solid inks for printing on a substrate such as paper. The ink dye vehicle is chosen to have a melting point above room temperature so that the ink, which is melted in the apparatus, will not be subject to evaporation or spillage during periods of non-printing. The vehicle selected possesses a low temperature to permit the use of the solid ink in a thermal ink jet printer. In thermal ink jet printing processes employing hot melt inks, the solid ink is melted by a heater in the printing apparatus and utilized as a liquid in a manner similar to that of conventional thermal ink jet printing. Upon contact with the printing substrate, the molten ink solidifies rapidly enabling the dye to remain on the surface instead of being carried into the paper by capillary action, thereby attempting to enable higher print density than is generally obtained with liquid inks. Hot melt ink jets are somewhat similar to thermal ink jets, however, a hot melt ink contains no solvent. Thus, rather than being liquid at room temperature, a hot melt ink is typically a solid or semi-solid having a wax-like consistency. These inks usually need to be heated, for example, to approximately 100° C. before the ink melts and converts into a liquid. With hot melt inks, a plurality of ink jet nozzles are provided in a printhead. A piezoelectric vibrating element is located in each ink channel upstream from a nozzle so that the piezoelectric oscillations propel ink through the nozzle. After the hot melt ink is applied to the substrate, the ink is resolidified by freezing on the substrate.

Each of these types of known ink jets, however, has a number of advantages and disadvantages. One advantage of thermal ink jets is their compact design for the integrated electronics section of the printhead. Thermal ink jets are disadvantageous in that the thermal ink has a tendency to soak into a plain paper medium. This blurs the print or thins out the print locally thereby adversely affecting print quality. Problems have been encountered with thermal ink jets in attempting to rid the ink of moisture fast enough so that the ink does not soak into a plain paper medium. This is particularly true when printing with color. Therefore, usually when printing with thermal ink, one needed to use coated papers, which are more expensive than plain paper.

One advantage of a hot melt ink jet is its ability to print on plain paper since the hot melt ink quickly solidifies as it cools and, since it is waxy in nature it does not normally soak into a paper medium. However, hot melt ink jets can be cumbersome in structure and in design, that is, the associated integrated electronics of a thermal ink jet head are considerably more compact than those of a hot melt ink jet head.

In addition, U.S. Pat. No. 4,751,528, the disclosure of which is totally incorporated herein by reference, discloses a hot melt ink jet system which includes a temperature-controlled platen provided with a heater and a thermoelectric cooler electrically connected to a heat pump and a temperature control unit for controlling the operation of the heater and the heat pump to maintain the platen temperature at a desired level. The apparatus also includes a second thermoelectric cooler to solidify hot melt ink in a selected zone more rapidly to avoid offset by a pinch roll coming in contact with the surface of the substrate to which hot melt ink has been applied. An airtight enclosure surrounding the platen is connected to a vacuum pump and has slits adjacent to the platen to hold the substrate in thermal contact with the platen.

Further, U.S. Pat. No. 4,791,439, the disclosure of which is totally incorporated by reference, discloses an apparatus for use with hot melt inks having an integrally connected ink jet head and reservoir system, the reservoir system including a highly efficient heat conducting plate inserted within an essentially nonheat conducting reservoir housing. The reservoir system has a sloping flow path between an inlet position and a sump from which ink is drawn to the head, and includes a plurality of vanes situated upon the plate for rapid heat transfer.

U.S. Pat. No. 5,006,170 and U.S. Pat. No. 5,122,187, the disclosures of each of which are totally incorporated herein by reference, disclose hot melt ink compositions suitable for ink jet printing which comprise a colorant, a binder, and a propellant such as hydrazine, cyclic amines, ureas, carboxylic acids, sulfonic acids, aldehydes, ketones, hydrocarbons, esters, phenols, amides, imides, halocarbons, and the like. The inks of the present invention are dissimilar than the aforementioned '179 and '187, in that, for example, the invention vehicle selected displays a viscosity of from about 1 to about 20, and preferably 5 centipoise when heated to a temperature of from about 120° C. to about 165° C., such that acoustic energy in the printhead can eject an ink droplet onto paper. Additionally, the vehicles of the present invention display softening points of from about 50° C. to about 100° C. and the invention vehicles, especially the oxazoline derivatives, are not disclosed in this prior art.

U.S. Pat. No. 5,041,161, the disclosure of which is totally incorporated herein by reference, discloses an ink jet ink which is semi-solid at room temperature. The ink combines the advantageous properties of thermal phase inks and liquid inks. The inks comprise vehicles, such as glyceryl esters, polyoxyethylene esters, waxes, fatty acids, and mixtures thereof, which are semi-solid at temperatures between 20° C. and 45° C. The ink is impulse jetted at an elevated temperature in the range of about 45° C. to about 110° C., at which temperature the ink has a viscosity of about 10 to 15 centipoise. The inks also contain 0.1 to 30 weight percent of a colorant system.

U.S. Pat. No. 4,853,036 and U.S. Pat. No. 5,124,718 disclose an ink for ink jet recording which comprises a liquid composition essentially comprising a coloring matter, a volatile solvent having a vapor pressure of 1 millimeter Hg or more at 25° C., and a material being solid at room temperature and having a molecular weight of 300 or more, and prepared so as to satisfy the formula $B_1/A_1 \geq 3$, assuming viscosity as $A_1$ cP at 25° C., measured when the content of the solid material in the composition is 10 percent by weight, and assuming viscosity as $B_1$ cP at 25° C., measured when the content of the solid material in the composition is 30 percent by weight. An ink jet recording process using the ink is also disclosed.

Oxazolines are known, as illustrated by R. H Wiley and L. L. Bennett in *Chemical Reviews*, volume 44, pages 447 to 476 (1949), the disclosure of which is totally incorporated herein by reference. Furthermore, oxazoline derivatives as being the major product from the reaction of an organic acid and amino alcohol is also known, such as disclosed by A. I. Meyers and D. L. Temple in the *Journal of the Chemical Society*, volume 92, page 6644 (1970), the disclosure of which is totally incorporated herein by reference.

While the known compositions and processes may be suitable for their intended purposes, a need remains for acoustic hot melt ink compositions suitable for thermal ink jet printing. In addition, there is a need for hot melt ink compositions which are compatible with a wide variety of plain papers. Further, there is a need for hot melt ink compositions which generate high quality, waterfast images on plain papers. There is also a need for hot melt ink jet ink compositions which generate high quality, fast-drying images on a wide variety of plain papers at low cost with high quality text and high quality graphics. Further, there is a need for hot melt ink jet ink compositions which exhibit minimal feathering. Additionally, there is a need for hot melt ink jet ink compositions which exhibit minimal intercolor bleed. There is also a need for hot melt ink jet ink compositions which exhibit excellent image permanence. Further, there is a need for hot melt ink jet ink compositions which are suitable for use in acoustic ink jet printing processes. Furthermore, there is a need for hot ink compositions suitable for ink jet printing processes wherein the substrate is heated prior to printing, and is cooled to ambient temperature subsequent to printing (also known as heat and delay printing processes). There is also a need for ink compositions suitable for ink jet printing wherein high optical densities can be achieved with relatively low dye concentrations. A need also remains for ink compositions suitable for ink jet printing wherein curling of the substrate, such as paper, subsequent to printing is minimized, or avoided. These and other needs and advantages are achievable with the inks of the present invention in embodiments thereof.

SUMMARY OF THE INVENTION

Examples of objects of the present invention include, for example:

It is an object of the present invention to provide hot melt ink compositions with many of the advantages illustrated herein.

It is another object of the present invention to provide hot melt ink compositions suitable for acoustic ink jet printing.

It is yet another object of the present invention to provide hot melt ink compositions which are compatible with a wide variety of plain papers, and wherein in embodiments the ink possesses a low viscosity of from 1 to about 5 centipoise at temperatures of from about 120° to about 145° C.

It is still another object of the present invention to provide hot melt ink compositions which generate high quality images on plain papers.

Another object of the present invention is to provide hot melt ink jet ink compositions which are comprised of a colorant, preferably a dye, and vehicle comprised of an oxazoline or benzoxazoline as the major component and optionally an amide and/or amino ester as the minor, for example in embodiments less than 30 weight percent, components, and wherein in embodiments the inks possess a low viscosity of, for example, 1 to 5 at 120° to about 150° C.

Yet another object of the present invention is to provide hot ink jet ink compositions which exhibit low viscosity of from about 1 to about 10 centipoise at a temperature of from about 120° C. to about 150° C.

Still another object of the present invention is to provide hot melt ink jet ink compositions which exhibit high projection efficiency.

It is another object of the present invention to provide hot melt ink jet ink compositions which exhibit excellent image permanence.

It is yet another object of the present invention to provide hot ink jet ink compositions that contain no water and which are suitable for use in acoustic ink jet printing processes.

It is still another object of the present invention to provide hot ink compositions that contain no water and that are suitable for ink jet printing processes wherein the substrate is heated prior to printing and is cooled to ambient temperature subsequent to printing (also known as heat and delay printing processes).

Another object of the present invention is to provide ink compositions suitable for ink jet printing wherein high optical densities can be achieved with relatively low dye concentrations.

Yet another object of the present invention is to provide solvent free hot melt ink compositions suitable for ink jet printing wherein curling of the substrate subsequent to printing is minimized.

Another object of the present invention resides in the provision of hot melt inks wherein the viscosity of the ink is from about 1 centipoise to about 10 centipoise at, for example, the jetting temperature which can be from about 120° C. to about 180° C., and preferably from about 120° C. to about 145° C. thereby enabling excellent jetting at reasonable power levels.

Further, in another object of the present invention there are provided hot melt inks with no water and a vehicle comprised of the reaction product of an organic acid and amino alcohol such as an oxazolines vehicle (I), and a colorant such as a dye, and wherein the ink can optionally further include an amino ester (III) or amide (II).

Additionally, in another object of the present invention there are provided hot melt inks with no water or solvent for ink printing methods and apparatuses, and wherein a number of the advantages as illustrated herein are achievable.

These and other objects of the present invention in embodiments thereof can be achieved by providing an ink composition comprised of a colorant and a vehicle comprised of an oxazoline as the major constituent, and which ink possesses a viscosity of from about 1 centipoise to about 10 centipoise at a temperature of from about 120° C. to about 150° C.; and an ink composition comprised of a colorant and an vehicle derived from an organic acid and amino alcohol, and which ink possesses a viscosity of from about 1 centipoise to about 5 centipoise at a temperature of from about 140° C. to about 165° C., and which ink contains optional known ink additives.

DETAILED DESCRIPTION OF THE INVENTION

In embodiments, the ink compositions of the present invention comprise from about 3 to about 15 percent by weight of dye or pigment, and about 85 to about 97 percent by weight of a vehicle. The vehicle is comprised of from about 65 to about 100 percent by weight of an oxazoline (I) as the major constituent, and of from about 0 to about 35 percent by weight of a mixture of an amide (II), and/or an amino ester (III).

Embodiments of the present invention include an ink composition comprised of a dye and a vehicle comprised of the reaction product of an organic acid, such as stearic acid, and an amino alcohol, such as 2-aminoethanol, and which product can be obtained by heating the reactants at elevated temperatures, such as from about 160° to about 180° C., optionally in the presence of a condensation catalyst such as butylstannoic acid or sulfuric acid. During the reaction, water is formed as the byproduct and removed via a distillation apparatus. The resulting product is identified by nuclear magnetic resonance (NMR) and infrared (IR) spectroscopy to be in embodiments a mixture of an oxazoline as the major product, for example about 65 to 100 percent by weight in embodiments, and further characterized by isolating the oxazoline compound by recrystallization using an appropriate solvent or mixture of solvents, such as dichloromethane, ethylacetate, methanol, toluene, hexane and the like, or by isolating the oxazoline using chromatographic separation with silica or alumina and appropriate known solvents. The minor constituents, for example about 0 to about 35 weight percent of the reaction product, are usually the amide (II) adduct of the organic acid and amino alcohol, or the amino ester (III) product. These latter two products (II) and (III) can also be isolated through chromatographic separation and identified by NMR and/or IR spectroscopy. The oxazoline compound is preferred as the ink vehicle primarily because of its low viscosity properties. The amide or amino ester derivatives display slightly higher viscosity, most likely due to the presence of H-bonding through the amide or amine moieties. Although the oxazoline can be isolated and utilized as the ink vehicle, it is preferable not to isolate the reaction product mixture primarily because of the higher cost associated with its isolation. It is preferable in embodiments that the reaction be optimized to obtain a reaction product wherein the oxazoline content is high, such as from about 65 to 100 percent by weight of the product, and preferably from about 85 to about 97 percent of the product. Furthermore, the use of solvent for the reaction is avoided primarily for cost reduction purposes.

Examples of organic acids utilized in preparing the vehicle include acetic acid, propanoic acid, butanoic acid, pentanoic acid, hexanoic acid, heptanoic acid, octanoic acid, decanoic acid, dodecanoic acid, tridecanoic acid, lauric acid, stearic acid, mixtures thereof, and the like, and which acid is utilized in an effective amount of, for example, from about 25 to about 75 percent by weight of the reaction mixture.

Examples of amino alcohols selected for the generation of the vehicles include 2-aminoethanol, 2-aminopropanol, 2-aminobutanol, 2-aminohexanol, 2-methyl-2-aminoethanol, 2-methyl-2-aminoethanol, 2-methyl-2-aminopropanol, 2-ethyl-2-aminoethanol, 2-ethyl-2-aminopropanol, 1-amino-2-propanol, 1-amino-2-butanol, 1-amino-2-pentanol, 3-amino-2-butanol, 2-amino-1,3-propanediol, 2-amino-2-ethyl-1,3-propanediol, 3-amino-1,2-propanediol, tris-(hydroxymethyl)aminomethane, mixtures thereof, and the like, and which alcohol is selected in an effective amount of, for example, from about 10 to about 50 percent by weight of the reaction mixture.

Examples of condensation catalysts that can be utilized include sulfuric acid, phosphoric acid, zinc chloride, magnesium chloride, zinc acetate, magnesium acetate, dibutyl tin laurate, butylstannoic acid, mixtures thereof, and the like, and which catalyst is selected in an effective amount of, for example, from about 0.01 to about 1 percent by weight of the reaction mixture.

In one embodiment of the present invention, a vehicle derived from 1 mole of stearic acid and 1 mole of 1-amino-2-propanol is prepared by charging a 1 liter Parr reactor equipped with a distillation apparatus and mechanical stirrer with about 284 grams of stearic acid, 75 grams of 1-amino-2-propanol and 0.3 gram of butylstannoic acid. The mixture is then heated with stirring to about 160° C., and wherein water is collected in the distillation receiver flask. The mixture is then heated to about 180° C. over a two hour period and the pressure is then decreased from atmospheric pressure to about 1 millimeter Hg over a 1 hour period. During the entire reaction time, about 31 grams of water are collected. The reaction mixture is then pressurized to atmospheric pressure and the product cooled to room temperature, about 25° C. The product was then characterized and was comprised of a mixture of about 95 percent by weight of 2-stearyl-4-methyl-oxazoline (structure I, wherein $R_1$ is stearyl group, $R_2$, $R_3$, and $R_4$ are hydrogen, and $R_5$ is a methyl group), and about 5 percent of N-(2-hydroxyethyl)-stearamide (structure II, wherein $R_1$ is stearyl, $R_2$, $R_3$, and $R_4$ are hydrogen, and $R_5$ is methyl, and which product has a melting point of about 82° C. as measured by the ELEC- TROTHERMAL® melting point apparatus, and wherein the structure or formula was determined by both proton and carbon-13 Nuclear Magnetic Resonance. The viscosity of the vehicle product can then be measured to be about 4 centipoise at a temperature of about 140° C.

Embodiments of the present invention include an ink composition with a certain vehicle of an oxazoline I or benzoxazoline Ia as represented by the following Formulas

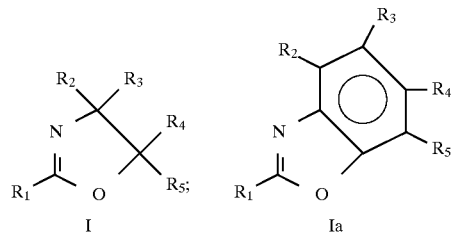

wherein $R_1$ is an alkyl group of from about 1 to about 55 carbon atoms, $R_2$, $R_3$, $R_4$ and $R_5$ are alkyl, an alkyl alcohol or an alkyl ester, each alkyl containing from about 1 to about 55 carbon atoms; wherein $R_2$, $R_3$, $R_4$ and $R_5$ are the alkyl alcohol —$(CH_2)_n$—OH, wherein n is an integer of from about 1 to about 6, or wherein $R_2$, $R_3$, $R_4$ and $R_5$ are the alkyl ester $(CH_2)n\text{-}O_2C\text{—}(CH_2)_m CH_3$, wherein n is an integer of from about 1 to about 6, and m is an integer of from about 1 to about 53; wherein the amide is present and is represented by the following Formulas II or IIa

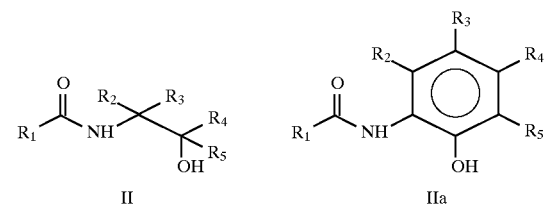

wherein $R_1$ is an alkyl group of from about 1 to about 55 carbon atoms, $R_2$, $R_3$, $R_4$ and $R_5$ are an alkyl, an alkyl alcohol or an alkyl ester group, each alkyl containing from about 1 to about 55 carbon atoms; wherein the amino ester is present, and is represented by the following Formula III

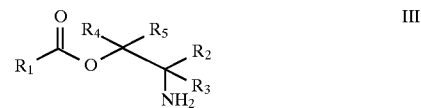

wherein $R_1$ is an alkyl group of from about 1 to about 55 carbon atoms, $R_2$, $R_3$, $R_4$ and $R_5$ are alkyl, an alkyl alcohol or an alkyl ester, each alkyl containing from about 1 to about 55 carbon atoms; a printing process which comprises incorporating into an acoustic ink jet printer an ink comprised of a colorant and an oxazoline component vehicle, and which ink possesses a viscosity of from about 1 centipoise to about 25 centipoise at a temperature of from about 125° C. to about 185° C.; an ink composition comprised of a colorant and an oxazoline vehicle, and which ink possesses a viscosity of from about 1 centipoise to about 25 centipoise at a temperature of from about 125° C. to about 185° C.; and an ink composition comprised of a colorant and a benzoxazoline vehicle, and which ink possesses a viscosity of from about 1 centipoise to about 25 centipoise at a temperature of from about 125° C. to about 185° C.

In another embodiment of the present invention, a vehicle derived from 2 moles of stearic acid and 1 mole of 2-amino- 2-ethyl-1,3-propanediol is prepared by charging a 1 liter Parr reactor equipped with a distillation apparatus and mechanical stirrer with about 284 grams of stearic acid, 60 grams of 2-amino-2-ethyl-1,3-propanediol and 0.5 gram of butylstannoic acid. The mixture is then heated with stirring to about 160° C., and wherein water is collected in the distillation receiver flask. The mixture is then heated to about 180° C. over a two hour period, and the pressure is then decreased from atmospheric pressure to about 1 millimeter Hg over a 1 hour period. During the entire reaction time, about 31 grams of water were collected. The reaction mixture is then pressurized to atmospheric pressure and the product cooled to room temperature. The product is then characterized and has a melting point of about 45° C. as measured by the ELECTROTHERMAL® melting point apparatus, and the structure thereof was determined by Nuclear Magnetic Resonance indicating that the product is comprised of a mixture of about 93 percent by weight of 2-stearyl-5-ethyl-5-methoxystearate-oxazoline (illustrated as structure IV), about 7 percent by weight of a mixture of N'-(2-methoxystearate-butane)stearamide (illustrated as structure V) and 2-stearyl-5-ethyl-5-methanol-oxazoline (illustrated as structure VI). The viscosity was then measured to be about 5.4 centipoise at a temperature of about 120° C.

A reaction sequence summary follows.

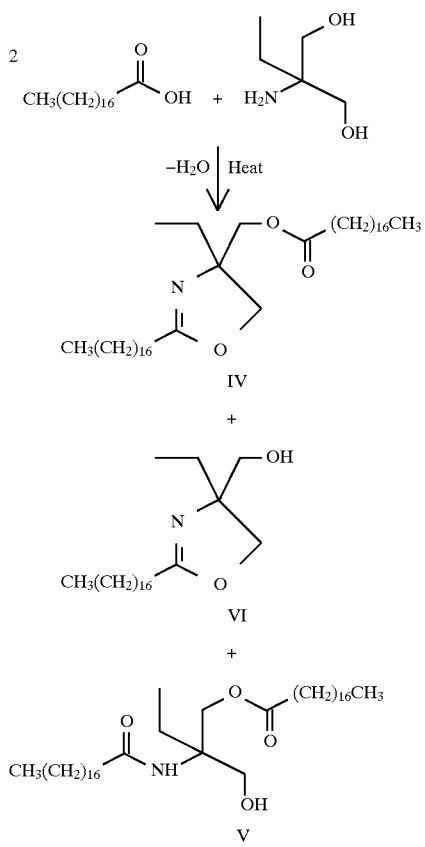

Oxazoline examples include 2-stearyl-5-ethyl-5-methoxystearate-oxazoline, 2-stearyl-5-ethyl-5-hydroxymethyl-oxazoline, 2-stearyl-4-ethyl-oxazoline, 2-stearyl-4-methoxystearate-oxazoline, 2-stearyl-4-hydroxymethyl-oxazoline, 2-stearyl-4-hydroxymethyl-bis-5,5-(methoxystearate)-oxazoline, 2-stearyl-5-hydroxymethyl-5-(methoxystearate)-oxazoline, mixtures thereof, and the like, as illustrated herein.

Examples of colorants, preferably dyes selected for the inks of the present invention, are known, reference the Color Index, and include those as illustrated in U.S. Pat. No. 5,310,887, the disclosure of which is totally incorporated herein by reference, and, for example, Resorcin Crystal Violet, Orasol Black RL or Intraplast Black RL/Solvent Black 29, Lapranol Black BR, Savinyl Black RLS, Orasol Black RLP, Neozapon Black X57; solvent yellow dyes inclusive of Savinyl Yellow 2 RLS, Savinyl Yellow RLSN, Intraplast Yellow 2GLN, Neozapon Yellow 081, Neozapon Yellow 141, Levaderm Lemon Yellow, Zapon Fast Yellow CGR, Aizen Fast Yellow CGNH, Zapon Yellow 100, Zapon Yellow 157, and Savinyl Yellow RLS; Neopan Yellow 075; Neopan blue; REGAL 3300 carbon black; Sunbright Yellow; Sunbright Rubine, Sunchem Yellow, Sunchem Blue, Sunchem Rubine available from Sun Chemical Corporation; magenta dyes such as Neozapon Red 492, Direct Brilliant Pink B, Savinyl Pink 6 BLS, Savinyl Red 3 BLS, Orasol Red 2 BL, Intraplast Red G (Orasol Red), Savinyl Red BLSN, Savinyl Scarlet RLS, Savinyl Fire Red 3GLS, and Zapon Red 335; cyan dyes such as Orasol Blue 2 GLN, Neozapon Blue 807, Savinyl Blue RLS, Savinyl Blue GLS, Orasol Blue GN, and Losol Blue; brown dyes inclusive of Zapon Brown 187 and Savinyl Brown GLS, Solvent Green 3, Sudan Black B, Ceres Blue 2V, Liquid Oil Jet Black, Macrolex Red G Gram, Macrolex Yellow 3G, Victoria Blue R, available from Bayer AG, Leverkusen, Germany, Morfast Blue 100, Morfast Red 104, and Morfast Red 100, available from Morton International Specialty Chemicals Group, Chicago, Ill.; mixtures thereof; and the like with preferred dyes in embodiments including Reactint Black 57AB, Reactint Black X40LV, Reactint Blue 17AB, Reactint Blue X3LV, Reactint Blue X19, Reactint Red X26B-50, Reactint Red X520, Reactint Violet X80LT, Reactint Orange X38, and Reactint Yellow X15, all available from Milliken Chemicals. Typically, the dye is present in the ink in an amount of from about 0.01 to about 10 percent by weight, preferably from about 0.05 to about 4 percent by weight, and more preferably from about 0.1 to about 3 percent by weight, although the amount can be outside these ranges.

The inks of the present invention can contain a colorant comprised of a mixture of dyes and pigments.

Optional ink additives include biocides such as DOWICIL 150™, 200™, and 75™, benzoate salts, sorbate salts, and the like, present in effective amounts, such as for example an amount of from about 0.0001 to about 4 percent by weight, and preferably from about 0.01 to about 2.0 percent by weight; pH controlling agents such as acids, or bases, phosphate salts, carboxylates salts, sulfite salts, amine salts, and the like, present in an amount of from 0 to about 1 percent by weight and preferably from about 0.01 to about 1 percent by weight, or the like.

The inks of the present invention are particularly suitable for printing processes wherein the substrate, such as paper, transparency material, or the like, is heated during the printing process to facilitate formation of the liquid crystalline phase within the ink. Preferably, the substrate is heated to the highest temperature possible to enable the most rapid possible ink drying without damaging the substrate. When transparency substrates are employed, temperatures typically are limited to a maximum of about 100° C. to about 110° C., since the polyester typically employed as the base sheet in transparency sheets tends to deform at higher temperatures. Specially formulated transparencies and paper substrates can, however, tolerate higher temperatures, frequently being suitable for exposure to temperatures of 150° C. or even 200° C. in some instances. Typical heating temperatures are from about 40° C. to about 140° C., and preferably from about 60° C. to about 95° C., although the temperature can be outside these ranges.

The inks of the present invention can be prepared by various suitable methods. For example, the inks can be prepared by gently stirring or shaking the individual components, such as melt mixing the vehicle with a colorant at a temperature of from about 90° C. to about 130° C., followed by cooling to about 25° C.

The inks of the present invention are particularly suitable for use in acoustic ink jet printing processes. In acoustic ink jet printing, reference the patents recited here, the disclosures of which have been totally incorporated herein by reference, an acoustic beam exerts a radiation pressure against objects upon which it impinges. Thus, when an acoustic beam impinges on a free surface of the ink of a pool of liquid from beneath, the radiation pressure which it exerts against the surface of the pool may reach a sufficiently high level to release individual droplets of liquid from the pool, despite the restraining force of surface tension. Focusing the beam on or near the surface of the pool intensifies the radiation pressure it exerts for a given amount of input power, reference for example *IBM Technical Disclosure Bulletin*, Vol. 16, No. 4, September 1973, pages 1168 to 1170, the disclosure of which is totally incorporated herein by reference. Acoustic ink printers typically comprise one or more acoustic radiators for illuminating the free surface of a pool of liquid ink with respective acoustic beams. Each of these beams usually is brought to focus at or near the surface of the reservoir (i.e., the liquid/air interface). Furthermore, printing conventionally is performed by independently modulating the excitation of the acoustic radiators in accordance with the input data samples for the image that is to be printed. This modulation enables the radiation pressure, which each of the beams exerts against the free ink surface, to make brief, controlled excursions to a sufficiently high pressure level for overcoming the restraining force of surface tension. That, in turn, causes individual droplets of ink to be ejected from the free ink surface on demand at an adequate velocity to cause them to deposit in an image configuration on a nearby recording medium. The acoustic beam may be intensity modulated or focused/defocused to control the ejection timing, or an external source may be used to extract droplets from the acoustically excited liquid on the surface of the pool on demand. Regardless of the timing mechanism employed, the size of the ejected droplets is determined by the waist diameter of the focused acoustic beam. Acoustic ink printing is attractive because it does not require the nozzles or the small ejection orifices which have caused many of the reliability and pixel placement accuracy problems that conventional drop on demand and continuous stream ink jet printers have suffered. The size of the ejection orifice is a critical design parameter of an ink jet because it determines the size of the droplets of ink that the jet ejects. As a result, the size of the ejection orifice cannot be increased without sacrificing resolution. Acoustic printing has increased intrinsic reliability since usually there are no nozzles to clog. Furthermore, small ejection orifices are avoided, so acoustic printing can be performed with a greater variety of inks than conventional ink jet printing, including inks having higher viscosities and inks containing pigments and other particulate components. Acoustic ink printers embodying printheads comprising acoustically illuminated spherical focusing lenses can print precisely positioned pixels (picture elements) at resolutions which are sufficient for high quality printing of relatively complex images. It has also been determined that the size of the individual pixels printed by such a printer can be varied over a significant range during operation, thereby accommodating, for example, the printing of variably shaded images. Furthermore, the known droplet ejector technology can be adapted to a variety of printhead configurations, including (1) single ejector embodiments for raster scan printing, (2) matrix configured ejector arrays for matrix printing, and (3) several different types of pagewidth ejector arrays, ranging from (i) single row, sparse arrays for hybrid forms of parallel/serial printing to (ii) multiple row staggered arrays with individual ejectors for each of the pixel positions or addresses within a pagewidth image field (i.e., single ejector/pixel/line) for ordinary line printing. Inks suitable for acoustic ink jet printing typically are liquid at ambient temperatures (i.e., about 25° C.), however, in other embodiments the ink is in a solid state at ambient temperatures and provision is made for liquefying the ink by heating or any other suitable method prior to introduction of the ink into the printhead. Images of two or more colors can be generated by several methods, including by processes wherein a single printhead launches acoustic waves into pools of different colored inks. Further information regarding acoustic ink jet printing apparatus and processes is disclosed in, for example, U.S. Pat. No. 4,308,547, U.S. Pat. No. 4,697,195, U.S. Pat. No. 5,028,937, U.S. Pat. No. 5,041,849, U.S. Pat. No. 4,751,529, U.S. Pat. No. 4,751,530, U.S. Pat. No. 4,751,534, U.S. Pat. No. 4,801,953, and U.S. Pat. No. 4,797,693, the disclosures of each of which are totally incorporated herein by reference. The use of focused acoustic beams to eject droplets of controlled diameter and velocity from a free-liquid surface is also described in *J. Appl. Phys.*, vol. 65, no. 9 (1 May 1989) and references therein, the disclosure of which is totally incorporated herein by reference.

Specific embodiments of the invention will now be described in detail. These Examples are intended to be illustrative, and the invention is not limited to the materials, conditions, or process parameters set forth in these embodiments. All parts and percentages are by weight unless otherwise indicated.

EXAMPLE I

An ink vehicle derived from the condensation product of one mole of stearic acid and one mole of 1-amino-2-propanol using butylstannoic acid as the catalyst was prepared as follows.

A 1 liter Parr reactor equipped with a distillation apparatus and mechanical stirrer was charged with about 284 grams of stearic acid, 75 grams of 1-amino-2-propanol and 0.3 gram of butylstannoic acid. The mixture was then heated with stirring to about 160° C., and wherein water was collected in the distillation receiver flask. The mixture was then heated to about 180° C. over a two hour period and the pressure was then decreased from atmospheric pressure to about 1 millimeter Hg over a 1 hour period. During the entire reaction time, about 31 grams of water were collected. The reaction mixture was then pressurized to atmospheric pressure and the product cooled to room temperature. The product resulting was then characterized to have a melting point of about 70° C. as measured by a melting point apparatus, and the product was identified by Nuclear Magnetic Resonance to be comprised of a mixture of about 93 percent by weight of 2-stearyl-4-methyl-oxazoline (structure I, wherein $R_1$ is stearyl group, $R_2$, $R_3$, and $R_4$ are hydrogen, and $R_5$ is a methyl group), and about 7 percent of N-(2-hydroxyethyl)-stearamide (structure II, wherein $R_1$ is a stearyl group, $R_2$, $R_3$, and $R_4$ are hydrogen, and $R_5$ is a methyl group). The viscosity, penetration and acoustic loss were then measured and are reported in Table 1.

EXAMPLE II

An ink vehicle derived from the condensation product of one mole of stearic acid and one mole of 2-amino-2-ethyl- 1,3-propanediol using butylstannoic acid as the catalyst was prepared as follows.

A 1 liter Parr reactor equipped with a distillation apparatus and mechanical stirrer was charged with about 284 grams of stearic acid, 60 grams of 2-amino-2-ethyl-1,3-propanediol and 0.49 gram of butylstannoic acid. The mixture was then heated with stirring to about 160° C., and wherein water was collected in the distillation receiver flask. The resulting mixture was then heated to about 180° C. over a two hour period and the pressure was then decreased from atmospheric pressure to about 1 millimeter Hg over a 1 hour period. During the entire reaction time, about 30 grams of water were collected. The reaction mixture was then pressurized to atmospheric pressure and the product cooled to room temperature. The product was characterized to have a melting point of about 45° C. as measured by the melting point apparatus, and the product was identified by Nuclear Magnetic Resonance to be comprised of a mixture of about 88 percent by weight of 2-stearyl-5-ethyl-5-methoxystearate-oxazoline (structure I, wherein $R_1$ is a stearyl group, $R_2$ is an ethyl group, $R_3$ is a $CH_2$—O—C(O)—$(CH_2)_{16}CH_3$ group, and $R_4$ and $R_5$ are both hydrogen atoms), about 8 percent by weight of 2-stearyl-5-ethyl-5-methanol-oxazoline (structure I, wherein $R_1$ is a stearyl group, $R_2$ is an ethyl group, $R_3$ is $CH_2$—O—H, and $R_4$ and $R_5$ are both hydrogen), and about 6 percent by weight of N'-(2-methoxystearate-butane)-stearamide (structure III, wherein $R_1$ is a stearyl group, $R_2$ is an ethyl group, $R_3$ is $CH_2$—O—C(O)—$(CH_2)_{16}CH_3$, and $R_4$ and $R_5$ are both hydrogen atoms). The viscosity, penetration point and acoustic loss were then measured and are reported in Table 1.

EXAMPLE III

An ink vehicle derived from the condensation product of one mole of stearic acid and 0.5 mole of 2-amino-2-ethyl-1,3-propanediol using butylstannoic acid as the catalyst was prepared as follows.

A 1 liter Parr reactor equipped with a distillation apparatus and mechanical stirrer was charged with about 284 grams of stearic acid, 120 grams of 2-amino-2-ethyl-1,3-propanediol and 0.25 gram of butylstannoic acid. The mixture resulting was then heated with stirring to about 160° C., and wherein water was collected in the distillation receiver flask. The mixture was then heated to about 180° C. over a two hour period and the pressure was then decreased from atmospheric pressure to about 1 millimeter Hg over a 1 hour period. During the entire reaction time, about 31 grams of water were collected. The reaction mixture was then pressurized to atmospheric pressure and the product cooled to room temperature. The product was characterized to have a melting point of about 35° C. as measured by a melting point apparatus, and the product was identified by Nuclear Magnetic Resonance to be comprised of a mixture of about 95 percent by weight of 2-stearyl-5-ethyl-5-methanol-oxazoline (structure I, wherein $R_1$ is a stearyl group, $R_2$ is an ethyl group, $R_3$ is a $CH_2$—O—H group, and $R_4$ and $R_5$ are both hydrogen atoms), and about 5 percent by weight of 2-(stearylacrylamido)-2-ethyl-1,3-propanediol (structure II, wherein $R_1$ is a stearyl group, $R_2$ is an ethyl group, $R_3$ is a $CH_2$—O—H group, and $R_4$ and $R_5$ are both hydrogen atoms). The viscosity, penetration point and acoustic loss were then measured and are reported in Table 1.

EXAMPLE IV

An ink vehicle derived from the condensation product of one mole of stearic acid and 0.5 mole of 3-amino-1,2-propanediol using butylstannoic acid as the catalyst was prepared as follows.

A 1 liter Parr reactor equipped with a distillation apparatus and mechanical stirrer was charged with about 284 grams of stearic acid, 45.5 grams of 3-amino-1,2-propanediol and 0.2 gram of butylstannoic acid. The mixture was then heated with stirring to about 160° C., and water was collected in the distillation receiver flask. The mixture was then heated to about 180° C. over a two hour period and the pressure was then decreased from atmospheric pressure to about 1 millimeter Hg over a 1 hour period. During the entire reaction time, about 31 grams of water were collected. The reaction mixture was then pressurized to atmospheric pressure and the product cooled to room temperature. The product was then characterized to have a broad melting point of about 85° to about 92° C. as measured by the melting point apparatus, and the product was identified by Nuclear Magnetic Resonance to be comprised of a mixture of about 75 percent by weight of 2-stearyl-4-methoxystearate-oxazoline (structure I, wherein $R_1$ is a stearyl group, $R_2$, $R_3$ and $R_4$ are hydrogen atoms and $R_5$ is a $CH_2$—O—C(O)—$(CH_2)_{16}CH_3$ group), about 25 percent by weight of a mixture of an amide (illustrated as structure II, wherein $R_1$ is a stearyl group, $R_2$, $R_3$ and $R_4$ are hydrogen atoms and $R_5$ is a $CH_2$—O—C(O)—$(CH_2)_{16}CH_3$ group) and an amino-ester (structure III, wherein $R_1$ is a stearyl group, $R_2$, $R_3$ and $R_4$ are hydrogen atoms and $R_5$ is a $CH_2$—O—C(O)—$(CH_2)_{16}CH_3$ group). The viscosity, penetration point and acoustic loss were then measured and are reported in Table 1.

EXAMPLE V

An ink vehicle derived from the condensation product of one mole of stearic acid and one mole of 3-amino-1,2-propanediol using butylstannoic acid as the catalyst was prepared as follows.

A 1 liter Parr reactor equipped with a distillation apparatus and mechanical stirrer was charged with about 284 grams of stearic acid, 91 grams of 3-amino-1,2-propanediol and 0.3 gram of butylstannoic acid. The mixture was then heated with stirring to about 160° C., and water was collected in the distillation receiver flask. The mixture was then heated to about 180° C. over a two hour period and the pressure was then decreased from atmospheric pressure to about 1 millimeter Hg over a 1 hour period. During the entire reaction time, about 31 grams of water were collected. The reaction mixture was then pressurized to atmospheric pressure and the product cooled to room temperature. The product was characterized to have a melting point of about 102° C. as measured by the melting point apparatus, and the structure product was identified by Nuclear Magnetic Resonance to be comprised of a mixture of about 96 percent by weight of 2-stearyl-4-methanol-oxazoline (structure I, wherein $R_1$ is a stearyl group, $R_2$, $R_3$, and $R_4$ are hydrogen atoms, and $R_5$ is a methanol group), and about 4 percent by weight of an amide (structure II, wherein $R_1$ is a stearyl group, $R_2$, $R_3$, and $R_4$ are hydrogen atoms and $R_5$ is a methanol group). The viscosity, penetration point and acoustic loss were then measured and are reported in Table 1.

EXAMPLE VI

An ink vehicle derived from the condensation product of one mole of stearic acid and 0.33 mole of tris (hydroxymethyl) aminomethane using butylstannoic acid as the catalyst was prepared as follows.

A 1 liter Parr reactor equipped with a distillation apparatus and mechanical stirrer with about 284 grams of stearic acid, 41 grams of tris(hydroxymethyl) aminomethane and 0.3 gram of butylstannoic acid. The mixture was then heated with stirring to about 170° C., and water was collected in the distillation receiver flask. The mixture was then heated to about 180° C. over a two hour period and the pressure was then decreased from atmospheric pressure to about 1 millimeter Hg over a 1 hour period. During the entire reaction time, about 30 grams of water were collected. The reaction mixture was then pressurized to atmospheric pressure and the product cooled to room temperature. The product was then characterized to have a melting point of about 75° to 80° C. as measured by the melting point apparatus, and the product was identified by Nuclear Magnetic Resonance to be comprised of a mixture of about 95 percent by weight of 2-stearyl-bis-5,5-(methoxystearate)-oxazoline (structure I, wherein $R_1$ is a stearyl group, $R_2$ and $R_3$ are $CH_2$—O—C(O)—$(CH_2)_{16}CH_3$ groups, and $R_4$ and $R_5$ are hydrogen groups), and about 5 percent by weight of a mixture of an amide (structure I, wherein $R_1$ is a stearyl group, $R_2$ and $R_3$ are $CH_2$—O—C(O)—$(CH_2)_{16}CH_3$ groups, and $R_4$ and $R_5$ are hydrogen groups), and 2-stearyl-bis-5-hydroxymethyl-5-(methoxystearate)-oxazoline (structure I, wherein $R_1$ is a stearyl group, $R_2$ is a methanol group, and $R_3$ is a $CH_2$—O—C(O)—$(CH_2)_{16}CH_3$ group, and $R_4$ and $R_5$ are hydrogen). The viscosity, penetration point and acoustic loss were then measured and are reported in Table 1.

EXAMPLE VII

An ink vehicle derived from the condensation product of one mole of stearic acid and 0.5 mole of tris(hydroxymethyl) aminomethane using butylstannoic acid as the catalyst was prepared as follows.

A 1 liter Parr reactor equipped with a distillation apparatus and mechanical stirrer with about 284 grams of stearic acid, 60.5 grams of tris(hydroxymethyl) aminomethane and 0.3 gram of butylstannoic acid. The mixture was then heated with stirring to about 170° C., and and water was collected in the distillation receiver flask. The mixture was then heated to about 180° C. over a two hour period and the pressure was then decreased from atmospheric pressure to about 1 millimeter Hg over a 1 hour period. During the entire reaction time, about 30 grams of water were collected. The reaction mixture was then pressurized to atmospheric pressure and the product cooled to room temperature. The product was characterized to have a melting point of about 61° C. as measured by the melting point apparatus, and the product/structure was identified by Nuclear Magnetic Resonance to be comprised of a mixture of about 95 percent by weight of 2-stearyl-bis-5-hydroxymethyl-5-(methoxystearate)-oxazoline (structure I, wherein $R_1$ is a stearyl group, $R_2$ is a methanol group, and $R_3$ is a $CH_2$—O—C(O)—$(CH_2)_{16}CH_3$ groups, and $R_4$ and $R_5$ are hydrogen groups), and about 5 percent by weight of an amide (structure II, wherein $R_1$ is a stearyl group, $R_2$ is a methanol group, and $R_3$ is a $CH_2$—O—C(O)—$(CH_2)_{16}CH_3$ group, and $R_4$ and $R_5$ are hydrogen). The viscosity, penetration point and acoustic loss were then measured and are reported in Table 1.

TABLE 1

| Vehicle | Viscosity mPa s (150° C.) | Acoustic Loss dB/mm (150° C.) | Penetration mm (25° C.) |
|---|---|---|---|
| Example I | 3.6 | 34.0 | 0.8 |
| Example II | 3.3 | 32.2 | 1.0 |

TABLE 1-continued

| Vehicle | Viscosity mPa s (150° C.) | Acoustic Loss dB/mm (150° C.) | Penetration mm (25° C.) |
|---|---|---|---|
| Example III | 4.0 | 32.0 | 2.3 |
| Example IV | 4.8 | 44.7 | 0.95 |
| Example V | 13.7 | 48.5 | 0.6 |
| Example VI | 4.4 | 34.0 | 0.45 |
| Example VII | 4.4 | 35.6 | 0.65 |

EXAMPLE VIII

An ink vehicle derived from the condensation product of one mole of stearic acid and one mole of 2-aminophenol using butylstannoic acid as the catalyst was prepared as follows.

A 1 liter Parr reactor equipped with a distillation apparatus and mechanical stirrer with about 284 grams of stearic acid, 109 grams of 2-aminophenol and 0.3 gram of butylstannoic acid. The mixture was then heated with stirring to about 170° C., and wherein water was collected in the distillation receiver flask. The mixture was then heated to about 180° C. over a two hour period and the pressure was decreased from atmospheric pressure to about 1 millimeter Hg over a 1 hour period. During the entire reaction time, about 30 grams of water were collected. The reaction mixture was then pressurized to atmospheric pressure and the product cooled to room temperature. The product was characterized to have a melting point of about 50° C. as measured by the melting point apparatus, and the product was identified further by Nuclear Magnetic Resonance to be comprised of a mixture of about 77 percent by weight of 2-stearylbenzoxazoline (structure Ia, wherein $R_1$ is a stearyl group, and $R_2$, $R_3$, $R_4$, and $R_5$ are all hydrogen atoms), about 23 percent by weight of a mixture of starting material and amide (structure IIa, wherein $R_1$ is a stearyl group, and $R_2$, $R_3$, $R_4$, and $R_5$ are all hydrogen atoms).

Penetration, Acoustic Loss and Viscosity Measurements

The penetration was measured using a K.I.C. penetrometer available by Noran Inc., using the following procedure.

1. A test sample was melted to approximately 20° C. above its melting point in an aluminum pan, with stirring to free any air bubbles.

2. The melted sample was then poured down a brass cylinder in a manner that a convex meniscus is formed. The brass cylinder, fitted at one end with a removable brass cover, was located inside a block heater cover down, and maintained in the molten state for one hour.

3. The sample and container were then cooled, inside the block heater, to 25° C. at a controlled rate, and left undisturbed for 24 hours at the measuring temperature.

4. The cylinder was then removed off the block heater and reversed. The brass cover was removed and a smooth, flat surface was exposed. The container was then positioned on the penetrometer base with the smooth surface up. A 100 gram weight is placed above the penetrometer needle, providing a total load of 150 gram for the needle and all attachments. The indicator assembly was then positioned to the "zero" position. The indicator assembly was then adjusted until the tip of the needle nearly touches the surface of the specimen. The movable assembly was locked in this position.

5. By means of the slow adjustment, the needle was brought to just touch the surface of the specimen. After 5 minutes, the needle shaft was released and held free for 5 seconds. Then, the indicator shaft was depressed until it was stopped by the needle shaft, and the penetration was read from the indicator scale in units of millimeter.

The acoustic attenuation is measured with a custom made acoustic test fixture comprised of two transducers set on top of each other. The bottom transducer is sitting on a translation stage so that it can be positioned laterally towards the top of the transducer to provide a maximum signal. The space between the transducers is controlled by a mechanism located on the bottom transducer. The top transducer is connected to an oscilloscope where the amplitude of the acoustic signal is detected. The attenuation is measured as the sound loss across the ink sample when the transducers are set apart by a predetermined distance. Each transducer is fitted with a heat resistance and a thermocouple coupled to a heat controller. The acoustic loss is then measured using the following procedure:

1. The ink sample specimen is placed in between the transducers. The temperature is adjusted to a set temperature of 150° C. The sample is then left undisturbed until it equilibrates to 150° C. for 5 minutes.

2. The two transducers are brought together in such a way that the acoustic signal on the oscilloscope is maximized. The amplitude and the position of the signal are recorded.

3. The two transducers are separated by a distance varying from 25.4 microns to 125.4 microns. Then, the amplitude and position of the signal are recorded. Each measurement is performed three times and three samples of the same specimen are measured.

4. The attenuation in decibel per millimeter (dB/mm) is then calculated by rationing the amplitude values obtained at different separation distances.

The rheological characterization was performed using Carri-Med CSL-100 controlled stress rheometer using a 4 centimeter, 2 degree cone and plate geometry. The measurement consisted of 5 consecutive shear rate sweeps, up to the maximum rate of 1,250 s$^{-1}$ and at a temperature of 100° C. to 180° C. increments. The infinite shear viscosity was then reported at 150° C.

EXAMPLE IX TO EXAMPLE XV

Various ink compositions comprised of about 95 percent by weight of vehicle and 5 percent by weight of colorant were prepared by melt mixing at 120° C. using a mechanical stirrer for a duration of 5 minutes. The colorants utilized were Neopan Yellow 075, Neopan Blue, both obtained from BASF Corporation, black pigment REGAL 330® obtained from Cabot, Sunbright Rubine obtained from Sun Chemical Corporation, and Reactint Black X57-AB obtained from Milliken Chemicals. The color properties and viscosity characteristics are reported in Table 2.

TABLE 2

| Vehicle | Vehicle | Colorant | Viscosity mPa s (150° C.) |
|---|---|---|---|
| Example IX | Example VI | Neopan Blue | 5.1 |
| Example X | Example II | Neopan Yellow | 4.7 |
| Example XII | Example VII | Neopan Yellow | 4.9 |
| Example XI | Example VI | Regal 330 | 11.0 |
| Example XIII | Example VI | Sunbright Rubine | 10.8 |

TABLE 2-continued

| Vehicle | Vehicle | Colorant | Viscosity mPa s (150° C.) |
|---|---|---|---|
| Example XIV | Example VI | Neopan Yellow | 4.8 |
| Example XV | Example VI | R. Black X57A | 4.2 |

Images developed with the above prepared inks in an acoustic ink jet printer test fixture evidence, it is believed, excellent image quality and the other advantages illustrated herein.

Other modifications of the present invention may occur to those of ordinary skill in the art subsequent to a review of the present application, and these modifications, including equivalents thereof, are intended to be included within the scope of the present invention.

What is claimed is:

1. An ink composition comprised of a colorant and a vehicle component, and which vehicle component is comprised of the condensation product of an organic acid and an amino alcohol, and a mixture of an amide and an amino ester, and wherein said mixture contains from about 1 to about 99 parts of said amide and from about 99 parts to about 1 part of said ester.

2. An ink in accordance with claim 1 wherein said amide is represented by Formulas II, or IIa

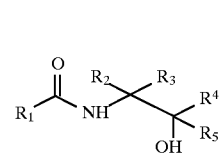 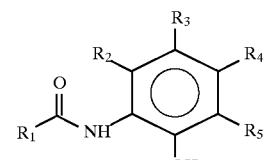

wherein R1 is an alkyl group of from about 1 to about 55 carbon atoms, $R_2$, $R_3$, $R_4$ and $R_5$ are an alkyl, an alkyl alcohol or an alkyl ester group, each alkyl containing from about 1 to about 55 carbon atoms.

3. An ink in accordance with claim 2 wherein $R_2$, $R_3$, $R_4$ and $R_5$ are the alkyl alcohol —$(CH_2)_n$—OH wherein n is an integer of from about 1 to about 6, or the alkyl ester —$(CH_2)$n-$O_2$C—$(CH_2)_m CH_3$ wherein n is an integer of from about 1 to about 6, and m is an integer of from about 1 to about 53.

4. An ink in accordance with claim 1 wherein said amino ester is represented by Formula III

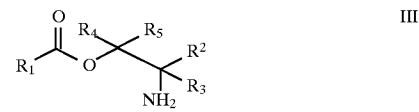

wherein $R_1$ is an alkyl group of from about 1 to about 55 carbon atoms, $R_2$, $R_3$, $R_4$ and $R_5$ are alkyl, an alkyl alcohol or an alkyl ester, each with from about 1 to about 55 carbon atoms.

5. An ink in accordance with claim 4 wherein $R_1$ is an alkyl group of from about 1 to about 55 carbon atoms, $R_2$, $R_3$, $R_4$ and $R_5$ are alkyl, an alkyl alcohol or an alkyl ester, each with from about 1 to about 55 carbon atoms.

6. An ink in accordance with claim 1 wherein said colorant is a dye.

7. An ink in accordance with claim 1 wherein said colorant is a pigment.

8. An ink in accordance with claim 1 wherein said colorant is comprised of mixtures of dyes and pigments.

9. An ink in accordance with claim 1 wherein said colorant is present in an amount of about 0.01 to about 10 percent by weight.

10. An ink in accordance with claim 1 wherein said colorant is present in an amount of about 1 to about 5 percent by weight.

11. An ink in accordance with claim 1 possessing a viscosity of about 1 to about 25 centipoise at a temperature of about 125° C. to about 185° C.

12. An ink in accordance with claim 1 possessing a viscosity of about 1 to about 10 centipoise at a temperature of about 120° C. to about 150° C.

13. An ink in accordance with claim 1 with about 85 to about 97 percent by weight of said vehicle, and about 3 to about 15 percent by weight of said colorant.

14. An ink in accordance with claim 1 wherein said condensation product is present in an amount of from about 65 to about 99 weight percent, and said mixture of amide and amino ester is present in an amount of from about 1 to about 35 weight percent.

15. A process which comprises (a) providing an acoustic ink printer having a pool of liquid ink with a free surface, and a printhead including at least one droplet ejector for radiating the free surface of said ink with focused acoustic radiation to eject individual droplets of ink therefrom on demand, said radiation being brought to focus with a finite waist diameter in a focal plane, and wherein said ink composition selected is comprised of a colorant, and a vehicle component, and which vehicle component is comprised of the condensation product of an organic acid and an amino alcohol; and (b) causing droplets of said ink to be ejected onto a recording sheet in an imagewise pattern at a temperature of from about 120° C. to about 185° C.

16. A printing process which comprises incorporating into an acoustic ink jet printer an ink and wherein said ink composition selected is comprised of a colorant and a vehicle component, and which vehicle component is comprised of the condensation product of an organic acid and an amino alcohol.

17. A process in accordance with claim 15 wherein said ink further contains an amide and/or an amino ester.

18. A process in accordance with claim 15 wherein said mixture contains from about 1 to about 99 parts of said amide, and from about 99 parts to about 1 part of said ester.

19. A process in accordance with claim 17 wherein said amide is represented by Formulas II or IIa

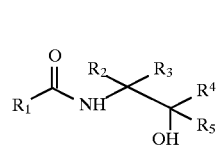 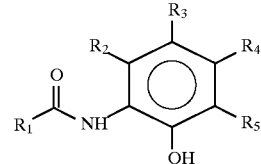

II  IIa wherein $R_1$ is an alkyl group of from about 1 to about 55 carbon atoms, $R_2$, $R_3$, $R_4$ and $R_5$ are an alkyl, an alkyl alcohol or an alkyl ester group, each alkyl containing from about 1 to about 55 carbon atoms; and said amino ester is represented by Formula III

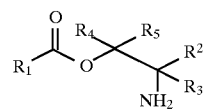

III wherein $R_1$ is an alkyl group of from about 1 to about 55 carbon atoms, $R_2$, $R_3$, $R_4$ and $R_5$ are alkyl, an alkyl alcohol or an alkyl ester, each with from about 1 to about 55 carbon atoms.

20. A process in accordance with claim 15 wherein the colorant is a pigment.

21. A process in accordance with claim 15 wherein the colorant is a dye.

* * * * *